(12) United States Patent
Engle

(10) Patent No.: US 7,059,726 B2
(45) Date of Patent: Jun. 13, 2006

(54) PROJECTION APPARATUS WITH LIGHT SOURCE TO OUTPUT LIGHT INTO AN INTEGRATING TUNNEL THROUGH A FIRST AND A SECOND MEDIUM

(75) Inventor: T. Scott Engle, Tualatin, OR (US)

(73) Assignee: Infocus Corporation, Wilsonville, OR (US)

(*) Notice: Subject to any disclaimer, the term of this patent is extended or adjusted under 35 U.S.C. 154(b) by 0 days.

(21) Appl. No.: 10/883,905

(22) Filed: Jul. 2, 2004

(65) Prior Publication Data

US 2006/0001843 A1    Jan. 5, 2006

(51) Int. Cl.
*G03B 21/28* (2006.01)
*G02F 1/1335* (2006.01)

(52) U.S. Cl. .............. 353/81; 353/28; 353/20; 348/798; 348/801; 349/62

(58) Field of Classification Search .......... 353/28, 353/20, 31, 80–87, 122; 348/798–803; 349/69, 349/61, 62; 362/51, 555, 561, 582, 800
See application file for complete search history.

(56) References Cited

U.S. PATENT DOCUMENTS

| | | | |
|---|---|---|---|
| 6,688,747 B1 * | 2/2004 | Wichner et al. | 353/29 |
| 2002/0186350 A1 * | 12/2002 | Peterson | 353/29 |
| 2003/0090632 A1 * | 5/2003 | Kim et al. | 353/31 |
| 2003/0197834 A1 * | 10/2003 | Kang | 353/31 |
| 2004/0174501 A1 * | 9/2004 | Slobodin et al. | 353/94 |
| 2005/0018149 A1 * | 1/2005 | Takeda et al. | 353/99 |
| 2005/0088624 A1 * | 4/2005 | Lee et al. | 353/31 |

* cited by examiner

*Primary Examiner*—W. B. Perkey
*Assistant Examiner*—Andrew Sever
(74) *Attorney, Agent, or Firm*—Schwabe Williamson & Wyatt

(57) ABSTRACT

A projection apparatus that includes a light source optically coupled to an integrating tunnel to output light into the integrating tunnel through a first and a second medium from a direction nonparallel to the output direction of the integrating tunnel. The first and second mediums having different indices of refraction to facilitate reflection of the output light from the light source off a reflective surface of the integrating tunnel and propagating the reflected light substantially towards an output end of the integrating tunnel.

25 Claims, 7 Drawing Sheets

100

200

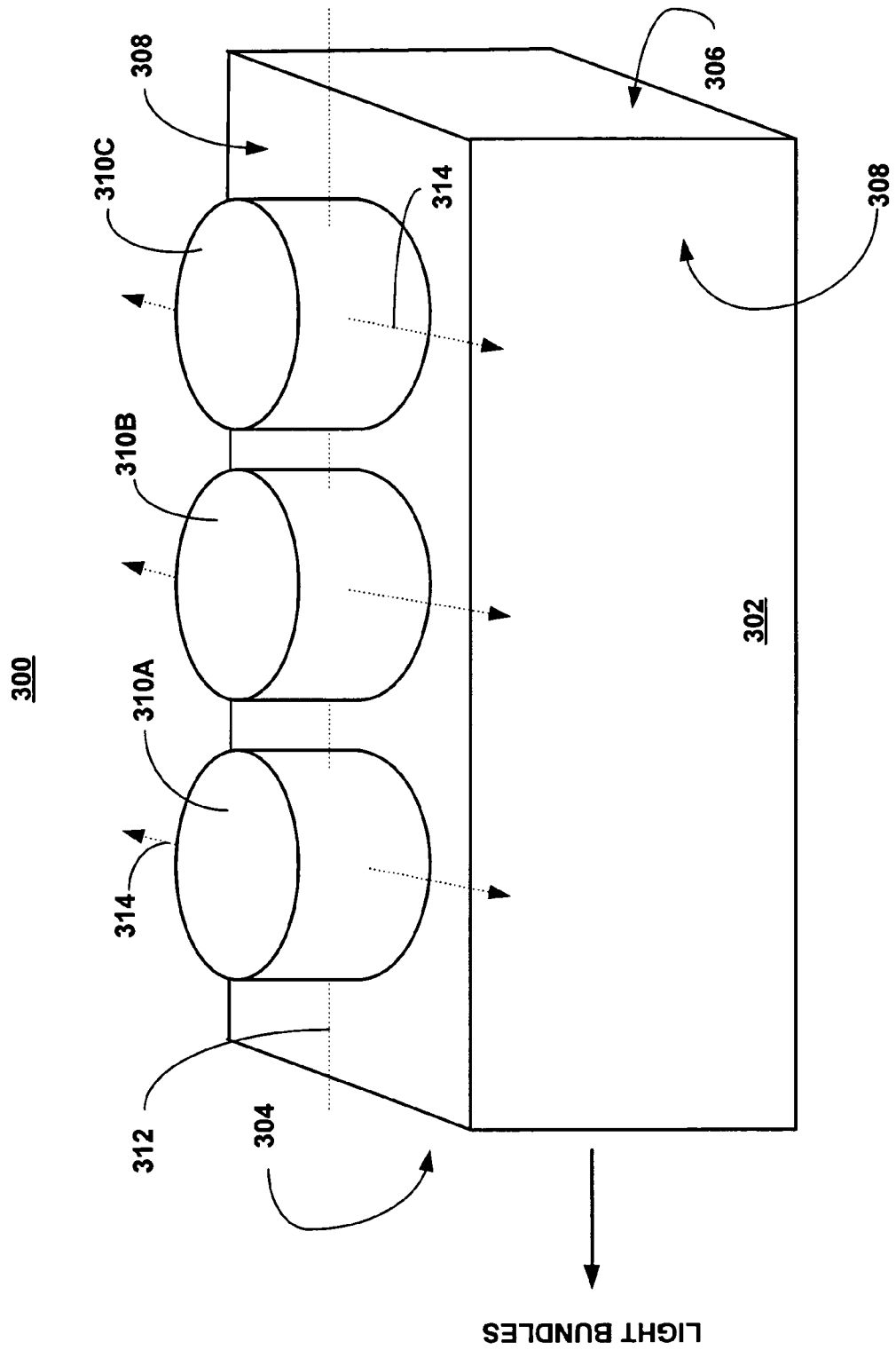

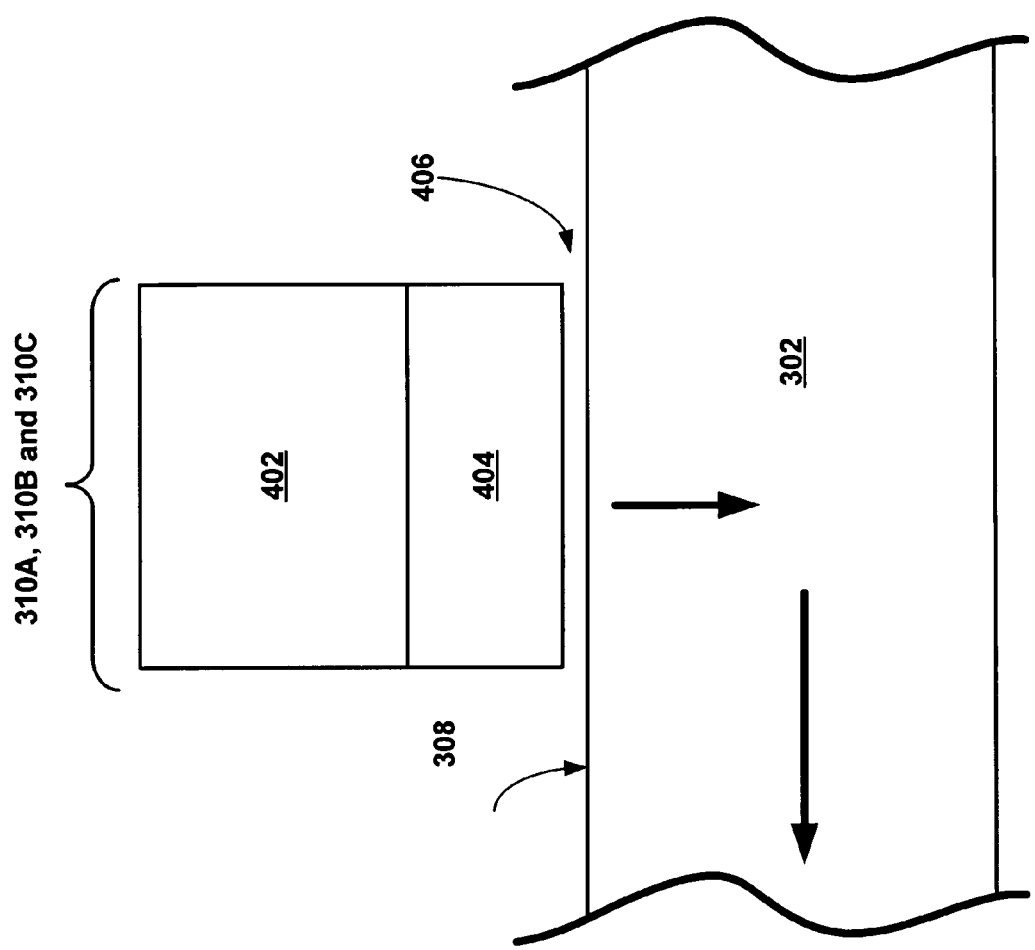

500

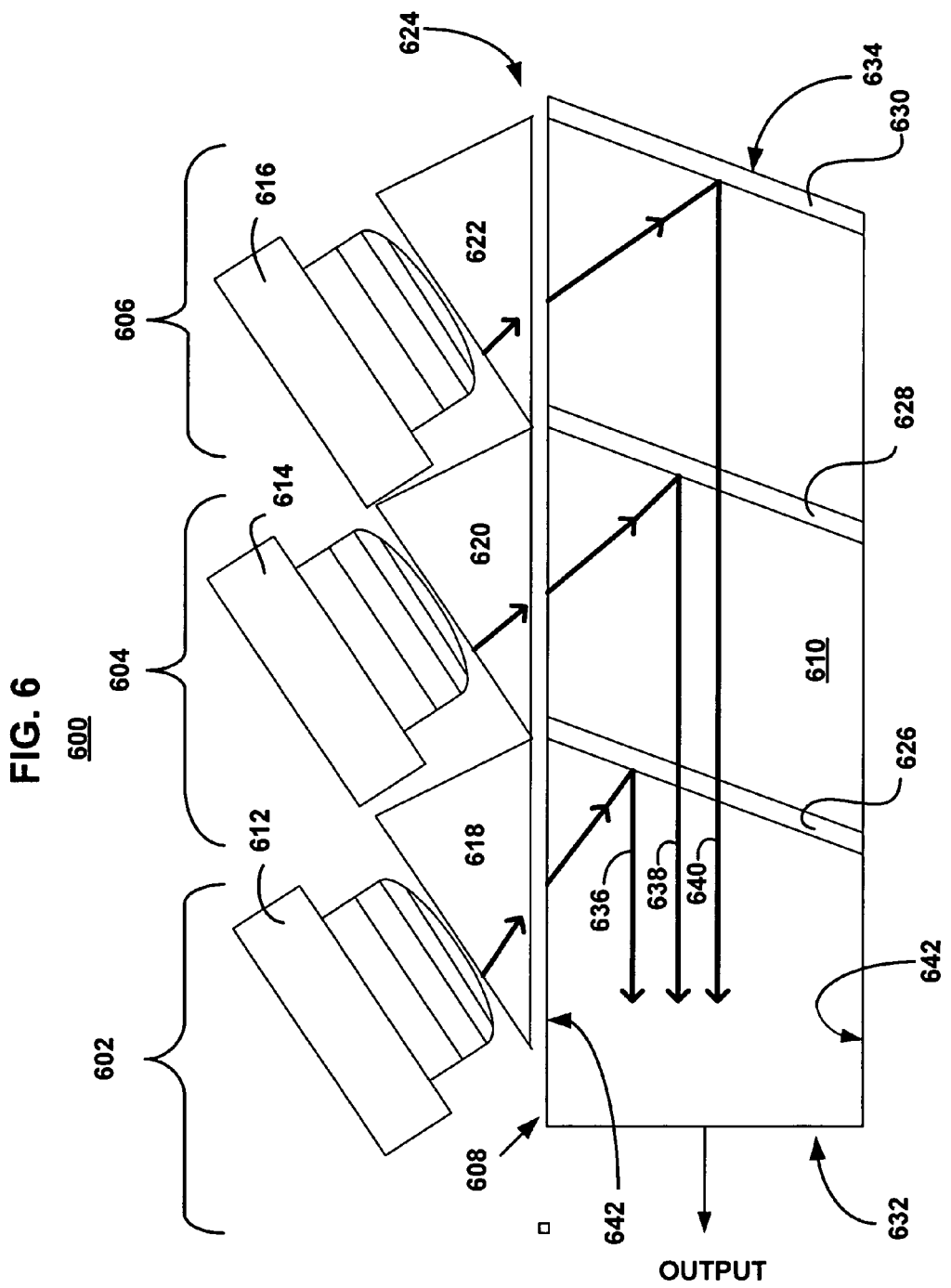

PROJECTION APPARATUS WITH LIGHT SOURCE TO OUTPUT LIGHT INTO AN INTEGRATING TUNNEL THROUGH A FIRST AND A SECOND MEDIUM

FIELD OF THE INVENTION

The present invention is related to the field of multimedia devices, and, more particularly, to digital projection systems.

BACKGROUND OF INVENTION

Historically, projection apparatuses or engines of projection systems have been designed employing high intensity discharge lamps. These prior art projection engines/systems suffer from a number of disadvantages. For example, the lamps typically have relatively short lives and reduced brightness after an initial period of usage. Further, there is an appreciable period of waiting for the lamp to warm up, when a projection engine/system is first turned on. During that period, either no image is available or the available images are of poor quality. Additionally, active cooling arrangements are typically required to dissipate the heat created during operation.

Resultantly, there has been a substantial interest in developing and manufacturing in a mass scale, projection engines and projection systems employing solid state light sources. Such engines/systems typically either do not have or have the aforementioned disadvantages to a lesser degree.

In addition, there has been a general trend in the field of projection systems as well as throughout the electronic industry to make electronic systems more compact and more efficient.

FIG. 1 illustrates a plane view of a typical solid state light source and micro mirror light valve based projection system architecture. The plane view may be a top view or a side view of the projection system. As illustrated, solid state light source based projection system 100 includes a number of primary color solid state light sources, such as light emitting diode (LED) 102, 104 and 106 sourcing red (R), green (G) and blue (B) lights respectively. LED 102, 104 and 106 are arranged in an orthogonal manner, respectively disposed on three sides of a dichroic combiner 108. Dichroic combiner 108 is employed to combine the lights emitted by LED 102, 104 and 106. Further, light integrator 110 is placed in the light path to enhance the combined light. A mirror 112 is employed to reflect the enhanced light onto a micro mirror device 114.

The micro mirror device 114, otherwise known as a light valve device, includes a number of micro-mirrors that may be individually tilted to an "on" or an "off" position to selectively reflect the enhanced light reflected from mirror 112 towards projection lens 116 ("on") or away from projection lens 116 ("off"). Resultantly, with each micro mirror corresponding to a pixel, and by selectively controlling their positions, an image or a series of images, including a series of images forming a motion picture, may be projected.

While the architecture of FIG. 1 works well, it is nevertheless desirable to further improve on reducing the cost and/or increasing reliability of the next generation of projection engines and projection systems.

BRIEF DESCRIPTION OF DRAWINGS

Embodiments of the present invention will be described referencing the accompanying drawings in which like references denote similar elements, and in which:

FIG. 3 illustrates an isometric view of an illumination module in accordance with various embodiments;

FIG. 4A illustrates a particular embodiment of a light source unit depicted in FIG. 3 in accordance with various embodiments;

FIG. 6 illustrates an illumination module in accordance with various embodiments.

DETAILED DESCRIPTIONS OF EMBODIMENTS OF THE INVENTION

In the following detailed description, various aspects of the embodiments of the invention will be described. However, it will be apparent to those skilled in the art that other embodiments may be practiced with only some or all of these aspects. For purposes of explanation, specific numbers, materials and configurations are set forth in order to provide a thorough understanding of these embodiments. However, it will also be apparent to one skilled in the art that other embodiments may be practiced without the specific details. In other instances, well-known features are omitted or simplified in order not to obscure the description.

In the description below, references will be made to different color lights or light bundles of different colors such as the primary colors of red, green and blue. In referring to these color lights or color light bundles, it is to be understood that each of these color lights or color light bundles may be associated with electromagnetic radiation having wavelengths that may be associated with specific colors.

According to some embodiments of the invention, an illumination module is provided that may be compact and efficient at generating light bundles. Such an apparatus may be incorporated into, for example, a projection system.

Figure 2:
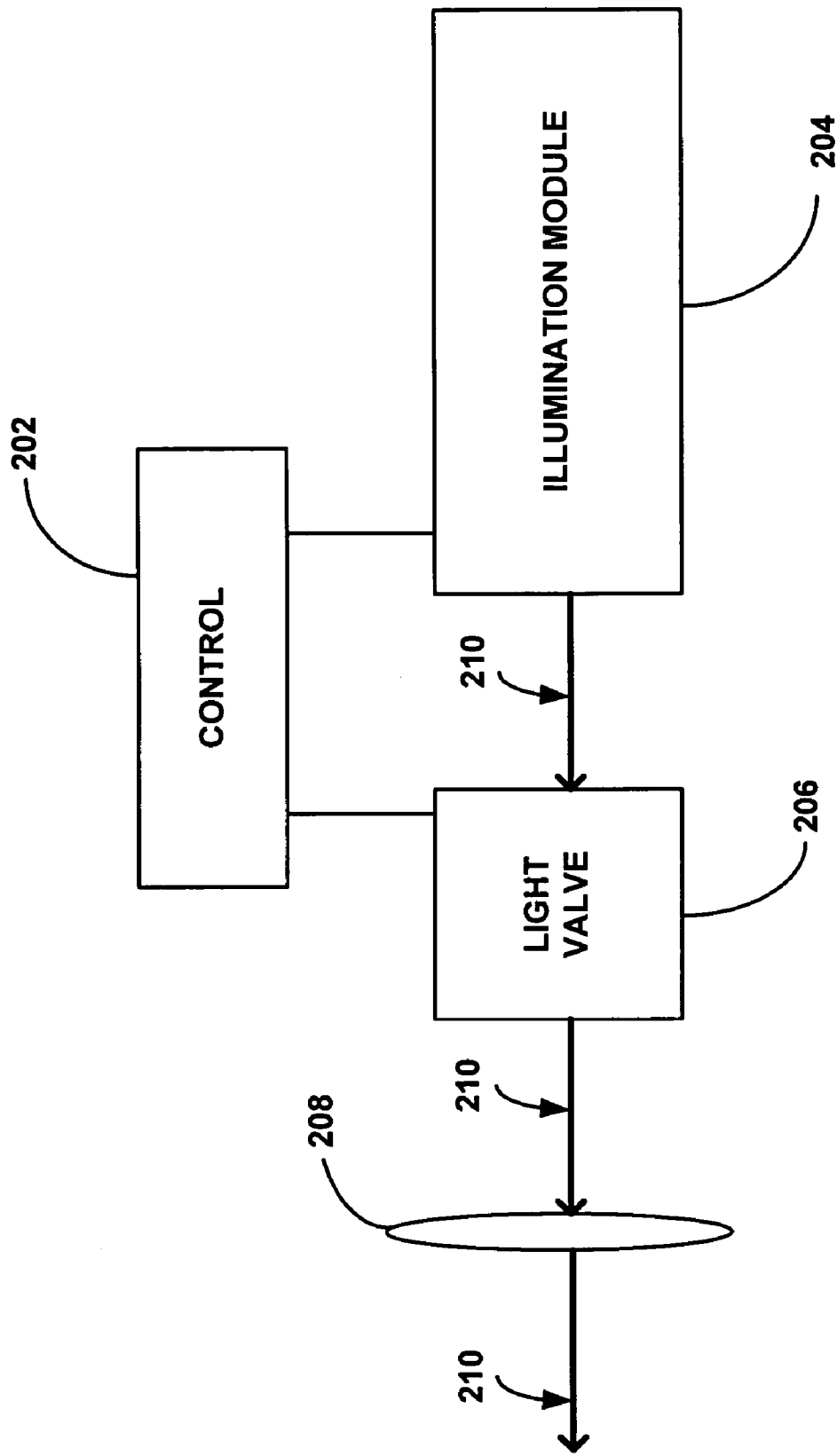
FIG. 2 illustrates a block diagram view of a projection system in accordance with various embodiments.

Referring to FIG. 2, which is a block diagram depicting a projection system according to some embodiments of the invention. The projection system 200 may be used to generate, for example, motion picture and/or still picture images onto a screen. For these embodiments, the projection system 200 includes a control block 202, an illumination module 204, a light valve device 206 and projection lens 208. For the embodiments, the control block 202 may be electrically coupled to the illumination module 204 and the light valve device 206. The illumination module 204 may be optically coupled to the light valve 206, which may further be optically coupled to a projection lens 208. Although not depicted, in other embodiments, other components may be included in the projection system 200 including, for example, a variety of optical components such as lens, light pipes, mirrors, prisms, polarizers, and the like, power supply components and control components.

The illumination module 204 may generate light bundles of different colors and transmit the light bundles to the light valve 206 according to some embodiments. The light valve 206 may then direct the light bundles to the projection lens 208, which allows the light bundles to pass through and project onto, for example, a screen. Although the optical light path 210 in FIG. 2 is depicted as being straight, in other embodiments, the optical light path 210 may not be straight but instead may have twists and turns. That is, the light bundles generated by the illumination module 204 may be redirected by various optical components such as mirrors, prisms, and the like.

The illumination module 204 may comprise of several components including, for example, a light integrator such as a light tunnel or integrating tunnel and one or more light sources such as solid state light sources. Other components such as mirrors, prisms, lenses, and the like, may also be included in the illumination module 204.

The illumination module 204, according to some embodiments, may generate light bundles of different colors such as the primary colors (i.e., red, green and blue), each light bundle comprising of specific colored light corresponding to specific electromagnetic wavelengths. The light bundles generated by the illumination module 204 may be shaped to reflect the shape of the light valve device 206. For example, since the images produced by a projection system may be projected onto a rectangular screen, the light valve device may have a rectangular shape. Consequently, the light bundles generated by the illumination module may also have a rectangular shape in various embodiments. The light bundles produced by the illumination module 204 may be transmitted to the light valve device 206, which may selectively control the amount of light that is transmitted or reflected to the projection lens 208.

Figure 1:
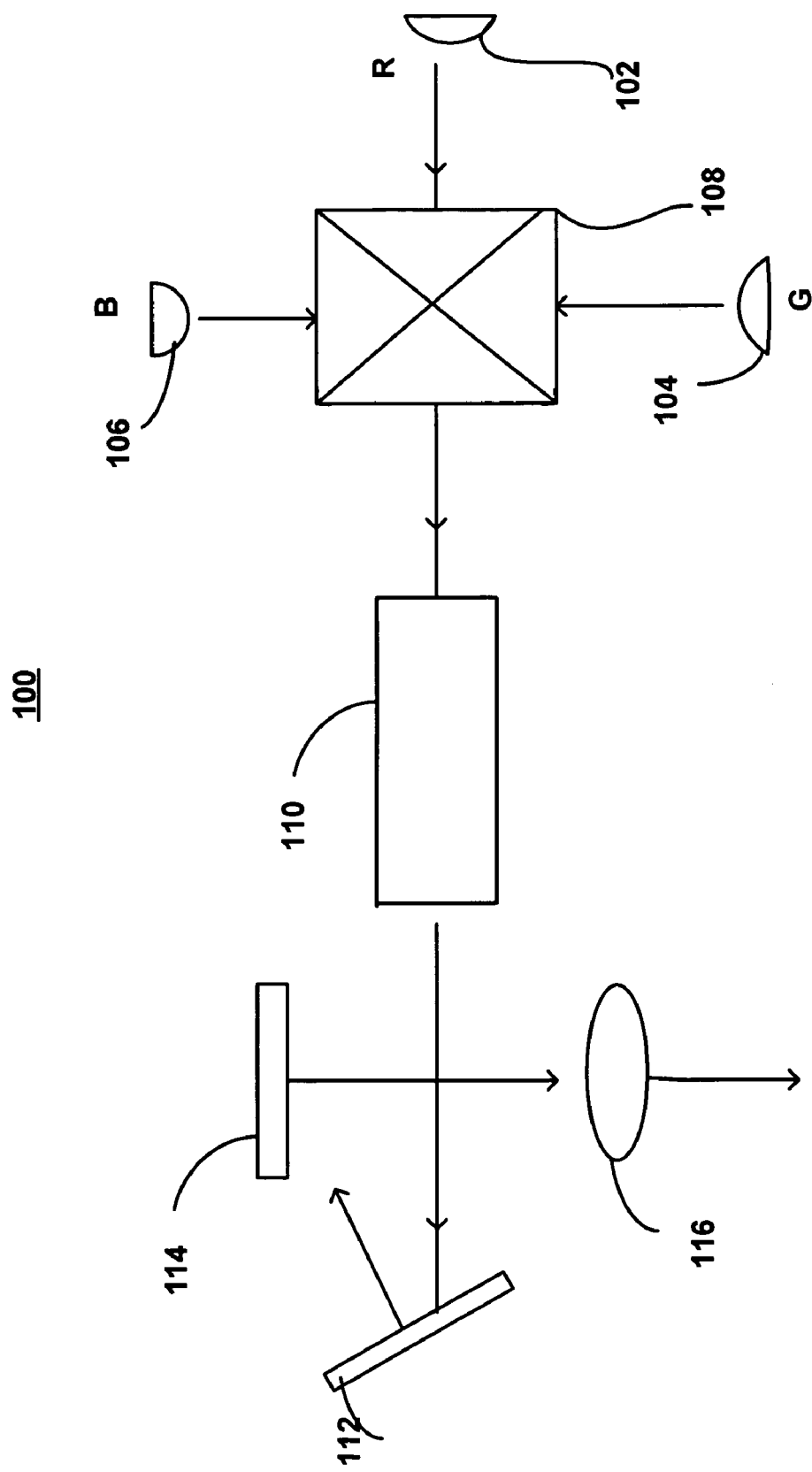
FIG. 1 illustrates a plane view of a typical prior art solid state light source based projection engine/system.

The light valve device 206 may direct and control the amount of each of the light bundles being transmitted or reflected to the projection lens 208. Although the light valve device 206 depicted in FIG. 2 is being depicted as a transmissive type of a light valve device that selectively allows light bundles to pass through, in other embodiments, the light valve device 206 may be a reflective type of light valve device that selectively reflects light bundles to the projection lens 208 via, for example, a mirror as depicted in FIG. 1. The light valve 206 may be, for example, a digital micromirror device (DMD), a reflective liquid crystal on semiconductor (LCOS) array device, a liquid crystal device (LCD) light valve, and the like.

The control block 202 may be employed to control light sources (not depicted) that may be included in the illumination module 204 and the light valve device 206 based on pixel data of images received by the control block 202. By controlling the operation of both the light sources of the illumination module 204 and the light valve device 206, the light valve device and the light sources may operate in a complementary manner. In some embodiments, the pixel data may be provided by, for example, an external computing/media device or an integrated TV tuner (through, for example, an input interface). In these embodiments, the control block 202 may cause the light sources to be driven sequentially. That is, the light sources may be prompted by the control block to emit, for example, light bundles of various colors in alternating sequence. In various embodiments, the control block may be implemented employing a general-purpose processor/controller, an application specific integrated circuit (ASIC), or a programmable logic device (PLD).

FIG. 3 depicts the illumination module of FIG. 2, in further detail, according to some embodiments. For the embodiments, the illumination module 300 includes an integrating tunnel (i.e., light tunnel) 302 having an output end 304, a far end 306 and side surfaces 308 that intersects the output end 304 and the far end 306. For the embodiment, the side surfaces 308 are flat surfaces. The output end 304 being the portion of the integrating tunnel 302 that may output light bundles of different colors associated with different wavelengths. Three light source units 310A, 310B and 310C are optically coupled to one of the side surfaces 308. In brief, a light source unit 310A, 310B and 310C may direct light into the integrating tunnel 302. In various embodiments, the three light source units 310A, 310B and 310C are a combination of a red light source unit, a blue light source unit and a green light source unit. Note that although the light source units 310A, 310B and 310C are depicted as having circular shapes, the light source units 310A, 310B and 310C may actually be of any shape and is depicted here as having a circular-like shape for illustrative purposes only.

The three light source units 310A, 310B and 310C may be positioned and optically coupled to a side surface 308 such that they are substantially aligned from the far end 306 to the output end 304 of the integrating tunnel 302. That is, the light source units 310A, 310B and 310C may be positioned along an axis 312 that extends from the far end 306 to the output end 304 of the integrating tunnel 302. In other embodiments, one or more of the three light source units 310A, 310B and 310C may be off-set from the axis 312 so that one or more of the three light source units 310A, 310B and 310C are not aligned along the axis 312 and may only be substantially aligned along the axis 312 as indicated by 314. In yet other embodiments, the light source units 310A, 310B and 310C may be located on different side surfaces 308 of the integrating tunnel 302.

The three light source units 310A, 310B and 310C, may each comprise of multiple components including, for example, a solid state light source such as an LED, and other optical components. These other optical components, such as prisms, may be used to redirect the light bundles produced by the light source into the integrating tunnel so that the light bundles may enter the tunnel at angles that may be, for example, most efficient in producing output light from the integrating tunnel 302.

Each of the three light source units 310A, 310B and 310C may output different color light bundles of different wavelengths and project the light bundles into the integrating tunnel 302. In various embodiments, the three light source units 310A, 310B and 310C, may include a red light source unit, a blue light source unit and a green light source unit. These light source units correspond to the primary colors of red, blue and green. In other embodiments, however, the three light source units 310A, 310B and 310C may output light bundles of other colors such as, for example, yellow, cyan, white and magenta.

According to one embodiment, the most efficient light source unit of the three light source units 310A, 310B and 310C may be located furthest away from the output end 304 while the least efficient light source unit may be located nearest to the output end 304. Such a scheme may assure that the different colored light bundles generated by the illumination module 300 generate a better color balance. That is, light that propagates through an integrating tunnel may have a tendency to attenuate due to, for example, leakage of the light from the integrating tunnel. Therefore, generally the further the light has to propagate through the integrating tunnel, the greater the attenuation of the propagating light. Balance may be achieved when the proper ratio of the combined colors are produced and mixed to get a desired color produced by their combination. For example, the proper ratio of red, green, and blue will produce a desirable shade of white. Thus, in order to generate a better balance of different color light bundles, the most efficient light source unit may be located furthest away from the output end 304 while the least efficient closest to the output end 304. This may result in minimal attenuation of the least available color and therefore may allow the maximum amount of balanced combined light to be emitted.

To illustrate, suppose the three light source units 310A, 310B and 310C produces three different primary colors, red, blue and green. Suppose further that the light source unit that produces the green light is the most efficient (e.g., has excess green light relative to the desired balance proportion), while the red light the least efficient. Then, in order to generate light bundles closer to the desired balance, the green light source unit may be located furthest from the output end, the red light source unit closest to the output end and the blue light source located in the middle. Further attenuation may be required to attain the ratio for the desired color balance. By minimizing the attenuation of the least available color, the maximum total amount of balanced combined color may be achieved.

In the foregoing description, for ease of understanding, surface 308 is referred to as the side surface. Surface 308 may also be referred to as top or bottom surface, as the qualification of the location of the surface is merely a function of the point of view from where the integrating tunnel 302 is described. Accordingly, the reference should not be read as limiting on the invention, and in the context of the location of the surface of the integrating tunnel, the terms "top surface", "bottom surface" and "side surface" are interchangeable.

Moreover, for ease of understanding, the integrating tunnel 302 of FIG. 3 is depicted as having a long square or rectangular shape. However, in other embodiments, the integrating tunnel 302 may have a cylindrical shape or other shape type. If the integrating tunnel is cylindrically shaped, then there may only be one side surface 308 that completely encircles the cylindrical shaped integrating tunnel. The integrating tunnel 302 may be hollow with walls or a solid tunnel. If the integrating tunnel 302 is hollow, then it may comprise of a plurality of external walls made of, for example, mirrors and/or a transparent material such as glass. If the integrating tunnel 302 is a solid tunnel then it may comprise substantially of transparent material such as glass having characteristics that may provide internal reflection of light that may propagate through the tunnel. In either cases (i.e., hollow or solid), the surface is simply just "surface" without the distinction of being "top", "bottom" or "side". Further, addition components may be present within the integrating tunnel such as mirrors and dichroic filters.

In various embodiments, the far end 306 may be a reflective end. For these embodiments, the far end 306 may be comprised of a mirror, a dichroic filter or some other reflective surface that reflects light within the integrating tunnel 302 and may prevent light within the tunnel from escaping out of the far end 306. In some embodiments, the far end 306 comprises of a reflective surface that only reflects but does not allow light to pass through such as a mirror. In those embodiments, the far end 306 may be an optically sealed end that may not allow light to be introduced through the far end 306. In other embodiments, however, the far end 306 may be comprised of a material or a component such as a dichroic filter that both reflect light and allows certain types of light to pass through. For these embodiments, light may be introduced through the far end 306. In yet other embodiments, the far end 306 may not include any internally reflective surfaces.

The integrating tunnel 302 may be implemented in a projection system to create a uniform illumination pattern with the same dimensional proportions as the final desired images according to some embodiments. Such an integrating tunnel 302 may operate on the principle of multiple reflection, wherein transmitted light that propagates through the tunnels may reflect off of internal interfaces of the integrating tunnels such that light bundles of substantially uniform intensity may be emitted from the output end 304 of the integrating tunnel 302.

FIG. 4A depicts one of the light source units 310A, 310B and 310C, in further detail, and the integrating tunnel 302 of FIG. 3, according to some embodiments. As briefly described above, a light source unit 310A, 310B and 310C may include a light source 402 and an optical coupling device 404 such as a prism or a mirror. In these embodiments, the light source unit 310A, 310B and 310C may be optically coupled to the integrating tunnel 302 via an air gap 406 that is interposed between the integrating tunnel 302 and the light source unit 310A, 310B and 310C. In various embodiments, the optical coupling device 404 and the air gap 406 represents two different mediums having two different indices of refraction.

The light source 402 may generate light bundles of a particular color such as a primary color. The light source 402 may be, for example, a solid state device such as a light emitting diode (LED), a laser diode, and the like. Light bundles generated by the light source 402 may be directed into the optical coupling device 404, which may channel the light bundles into the integrating tunnel 302.

The optical coupling device 404 may or may not redirect the light bundles generated by the light source 402 such that the light bundles enters the integrating tunnel 302 at a different angle than they would have in the absence of the optical coupling device 404. The optical coupling device 404 may be, for example, a prism, mirror, fiber optics, and the like.

The air gap 406 may reduce internal reflection losses of the integrating tunnel 302 in accordance with some embodiments. That is, in some embodiments, the difference in the refractive index of the air in the air gap 406 and the integrating tunnel material (e.g., glass) may result in reducing the amount of light (already propagating through the integrating tunnel) that may escape. If the air gap 406 were not present, the optical coupling device 404 would contact with the integrating tunnel 302. Because the optical coupling device 404 and integrating tunnel 302 have closer indices of refraction, in such a situation, some of the light inside the integrating tunnel 302 would pass into the optical coupling device 404 instead of internally reflecting. Therefore, by placing an intermediate medium (i.e., air gap 406) with a different index of refraction between the optical coupling device 404 and the integrating tunnel 302, internal reflection losses may be reduced.

In other embodiments, the air gap 406 may contain other mediums other than air that has a refractive index that is different from the refractive index of the material comprising the optical coupling device 404, the integrating tunnel 302 and/or the integrating tunnel walls. For example, in various other embodiments, other gases may occupy the gap or space between the integrating tunnel 302 and the light source unit 310A, 310B and 310C. Thus, the term "air gap" is used herein to describe a gap that is at least partially filled with composition or compositions having a different index of refraction from the index of refraction of the optical coupling device 404, the integrating tunnel 302 and/or its walls.

Figure 4B:
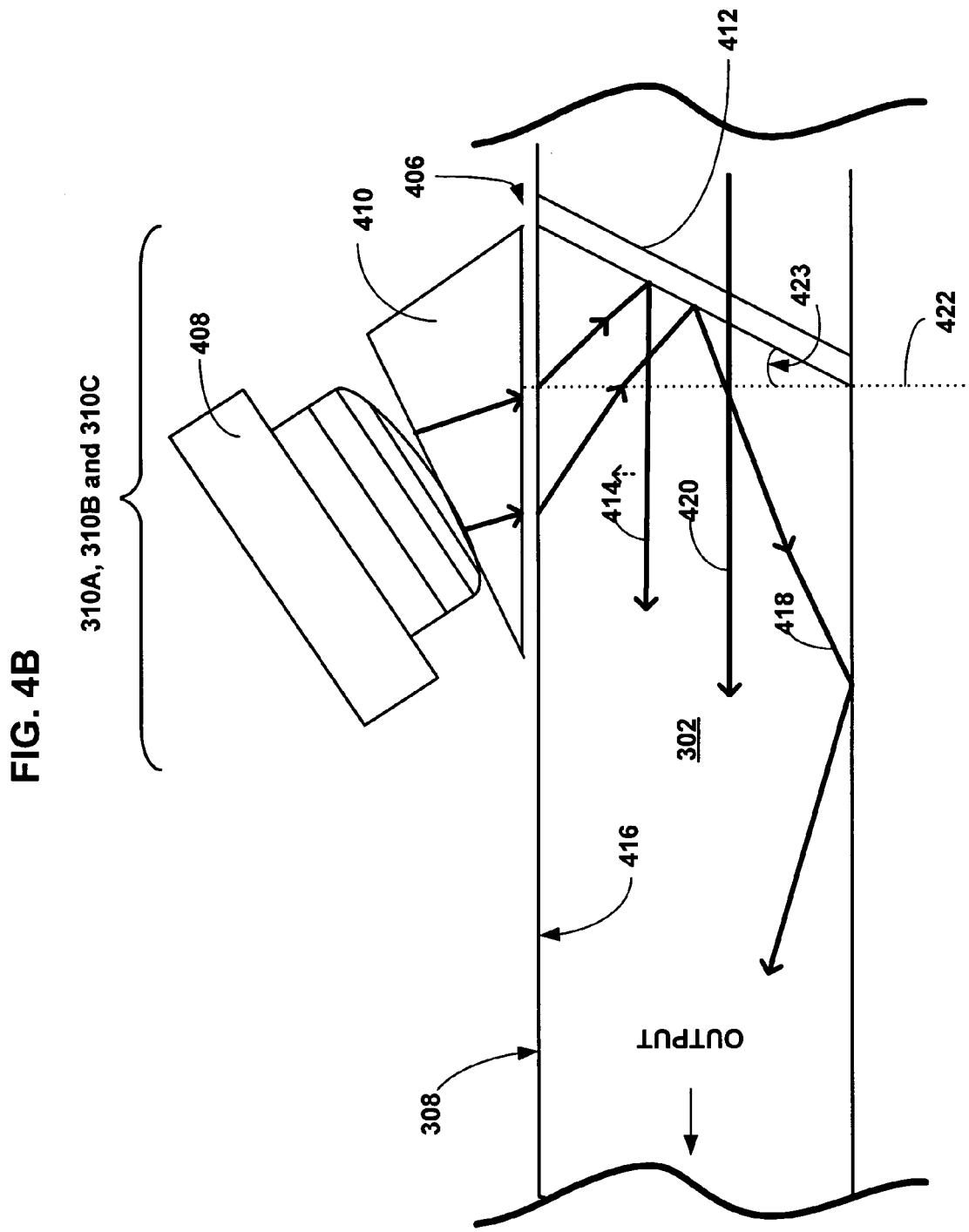
FIG. 4B illustrates the light source unit and integrating tunnel depicting in FIG. 4A, in further detail, in accordance with various embodiments.

Referring to FIG. 4B, which depicts the light source unit and integrating tunnel of FIG. 4A, in further detailed, according to some embodiments. Note that FIG. 4B, in addition to depicting the light source unit and integrating tunnel of FIG. 4A in detail, may also represent an illumination module comprising of a single light source unit coupled to a side surface of an integrating tunnel according to various embodiments. For the embodiments, a light source unit 310A, 310B and 310C may include a light source, in this case, an LED 408, and an optical coupling device, in this case, a prism 410. The prism 410 may be optically coupled to the LED 408 and to a side surface 308 of the integrating tunnel 302 through an air gap 406 that may be interposed between the prism 410 and the side surface 308 of the integrating tunnel 302. The prism 410 when employed in such a manner may be referred to as an air-gap prism. For these embodiments, a dichroic filter 412 may be positioned within the integrating tunnel 302 to reflect light bundles transmitted into the integrating tunnel 302 by the LED 408 via the prism 410. Although not shown, the integrating tunnel 302 may further be coupled with other light source units.

For the embodiment, the LED 408 may generate and direct light bundles of a particular color into the prism 410. The prism 410 receives the light bundles from the LED 408 and may or may not redirect the received light bundles such that the light bundles enter the integrating tunnel 302 at a different angle than they would have entered if the prism 410 were absent. The light bundles entering the integrating tunnel 302 may reflect off the dichroic filter 412 in such a way that the light bundles propagates substantially towards the output end of the integrating tunnel. That is, the light bundles may reflect off the dichroic filter 412 and may propagate directly towards the output end of the integrate tunnel (as depicted by 414) or at shallow angles relative to the internal interface 416 of the integrating tunnel 302 (as depicted by 418) such that at least a portion of the light bundles are reflected generally towards the output end rather than being transmitted out of the integrating tunnel 302. The dichroic filter 412 may further allow light bundles outputted by other light source units to pass through (as depicted by 420).

The prism 410 may be physically coupled to the side surface 308 of the integrating tunnel 302 using various techniques including, for example, using an adhesive that may or may not have the same refractive index as the prism 410 applied minimally at the periphery of the prism 410. The prism 410 may receive light bundles outputted by the LED 408 and redirect the light bundles into the integrating tunnel 302 at an angle different from the angle they would have entered into the integrating tunnel 302 in the absence of the prism 410.

According to one embodiment, the dichroic filter 412 (or its surfaces) may be positioned within the integrating tunnel such that it is at an angle of about 30 degrees from a plane 422 perpendicular to the internal interface 416 of the integrating tunnel 302 as indicated by 423. In other embodiments, the dichroic filter 412 may be at an angle of 45 degrees or some other angle from the plane 422. Such orientations may allow light bundles of certain wavelengths to pass through (as depicted by ref. 420) while reflecting light bundles of other wavelengths (as depicted by refs. 414 and 418).

Note that if the LED 408 represents the light source of a light source unit that is located furthest away from the output end (e.g., the light source unit 310C of FIG. 3) then the dichroic filter 412 may be replaced by a mirror or some other component having a reflective surface in some embodiments. This may be particularly true, for example, when there is no additional light source or light source unit that is located on the far end side of the dichroic filter 412 (or reflective surface).

According to various embodiments, an air gap 406 may be interposed between the prism 410 and the side surface 308 of the integrating tunnel 302. Placing an air gap between the prism 410 and the side surface 308 of the integrating tunnel 302 may improve the internal reflective properties of the integrating tunnel 302. As a result, the loss of light or light leakage from the integrating tunnel 302 through the side surface 308 may be reduced or completely eliminated and may result in the integrating tunnel having total internal reflection.

Figure 5:
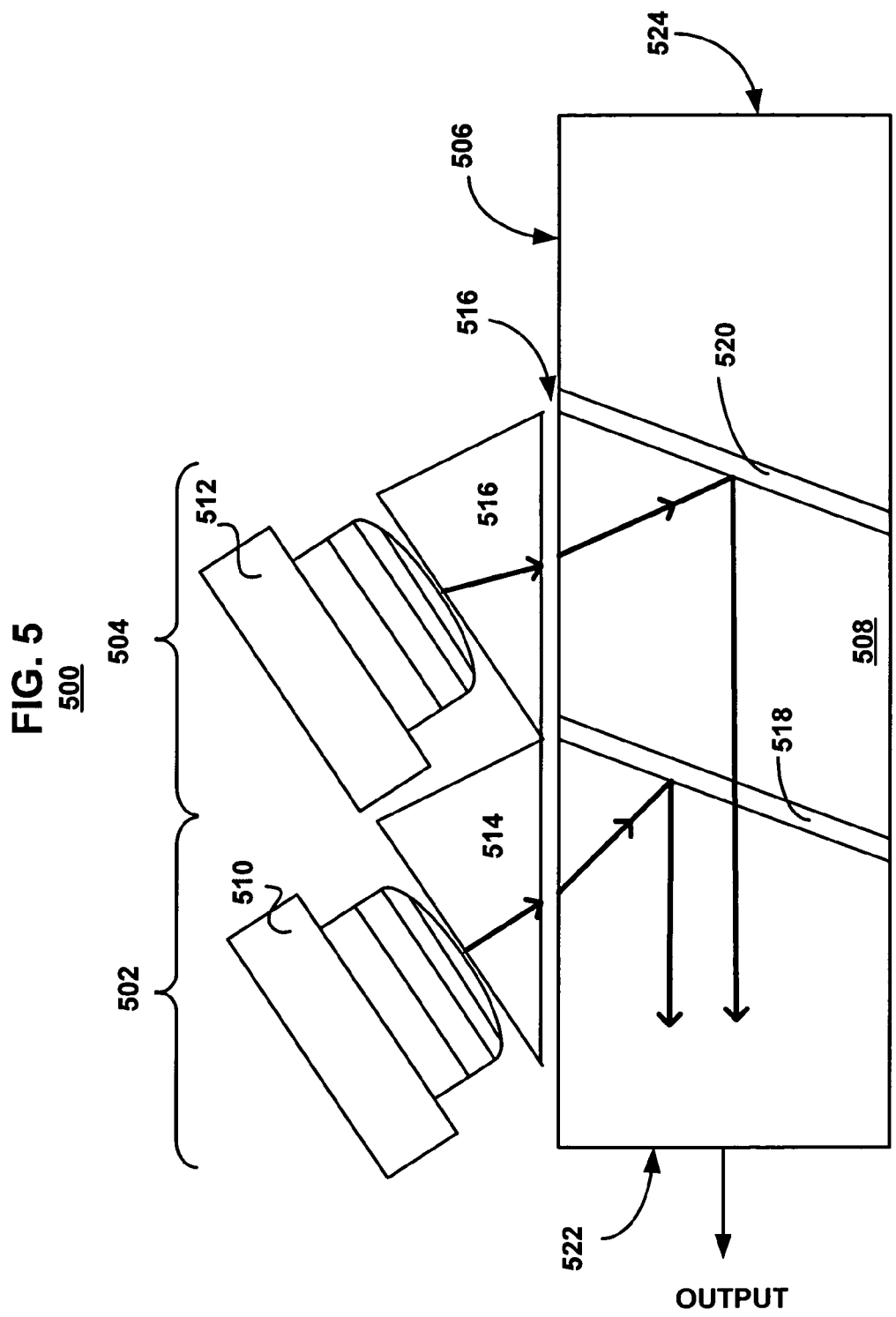
FIG. 5 illustrates an illumination module in accordance with various embodiments.

Referring to FIG. 5 depicting a illumination module 500 with two light source units 502 and 504 (a first and a second light source unit) that are optically coupled to a side surface 506 of an integrating tunnel 508, according to some embodiments. For these embodiments, each of the light source units 502 and 504 comprises of an LED 510 and 512 (a first and a second light source) and a prism 514 and 516 (a first and a second optical coupling device). An air gap 516 is interposed between the light source units 502 and 504 and the side surface 506 of the integrating tunnel 508. For these embodiments, the integrating tunnel 508 includes two dichroic filters 518 and 520. In addition to the side surface 506, the integrating tunnel 508 having an output end 522 and a far end 524. Although not depicted, for the embodiments, the integrating tunnel 508 may be coupled with one or more additional light source units located at the far end 524 portion of the integrating tunnel 508. For example, an additional one or more light source units may be optically coupled to the far end 524 of the integrating tunnel 508 if, for example, the far end 524 comprises of a dichroic filter rather than a mirror.

The light bundles generated by LED 510 (first light source) is transmitted through the prism 514 (first optical coupling device) into the integrating tunnel 508 and reflected off of the first dichroic filter 518 directly or indirectly (not shown) towards the output end 522 of the integrating tunnel 508. Similarly, the light bundles generated by LED 512 (second light source) is transmitted through the prism 516 (second optical coupling device) into the integrating tunnel 508 and reflected off of the second dichroic filter 520 directly or indirectly (not shown) towards the output end 522 of the integrating tunnel 508 and through the first dichroic filter 518.

At this point, it should be noted that the light source (i.e., LED) and the optical coupling device (i.e., prism) of each of the light source units 502 and 504 may be replaced with other components in various other embodiments. For example, in some embodiments, one or both of the LEDs may be replaced with laser diodes while one or both of the prisms may be replaced with mirrors.

FIG. 6 depicts an illumination module 600 with three light source units 602, 604 and 606 that are optically coupled to a side surface 608 of an integrating tunnel 610, according to some embodiments. For these embodiments, each of the light source units 602, 604 and 606 comprising of an LED 612, 614 and 616 (a first, a second and a third light source) and a prism 618, 620 and 622 (a first, a second and a third optical coupling device). An air gap 624 may be interposed between the light source units 602, 604 and 606 and the side surface 608 of the integrating tunnel 610. The integrating tunnel 610 includes three dichroic filters 626, 628 and 630. In other embodiments, a mirror or other reflective surfaces may replace the third dichroic filter 630. In addition to the side surface 608, the integrating tunnel 610 having an output end 632 and a far end 634, in this case, the far end 634 comprising of the third dichroic filter 630. Although not depicted, the integrating tunnel 610 may be coupled with one or more additional light source units located at the far end 634 portion of the integrating tunnel 610. For example, an additional one or more light source or one or more light source units may be optically coupled to the far end 634 of the integrating tunnel 610 in some embodiments. In other embodiments, however, if the far end 634 is a light sealed far end such as when the far end is comprised of a mirror than no additional light sources or light source units may be coupled to the far end 634.

Each of the light source units 602, 604 and 606 may transmit light bundles of different colors such as primary colors into the integrating tunnel 610. The light bundles that are transmitted into the integrating tunnel 610 may reflect off of the dichroic filters 626, 628 and 630 and propagate either directly towards the output end 632 of the integrating tunnel 610 as depicted by refs. 636, 638 and 640 or indirectly towards the output end 632 (not shown). If the light bundles are propagating indirectly towards the output end 632, then the light bundles may be propagating at shallow angles relative to the internal interfaces 642 of the integrating tunnel 610. This may result in the light bundles being efficiently reflected off the internal interfaces 642 of the integrating tunnel 610 and propagating in the general direction of the output end 632 of the integrating tunnel 610.

Again, it should be noted that the light source (i.e., LED) and the optical coupling device (i.e., prism) of each of the light source units 602, 604 and 606 may be replaced with other components in various other embodiments. For example, one or more of the LEDs may be replaced with, for example, laser diodes, while one or more of the prisms, for example, may be replaced with mirrors.

According to one embodiment, the most efficient light source unit of the three light source units 602, 604 and 606 may be located furthest away from the output end 632. Such architecture may assure that the different colored light bundles generated by the illumination module 600 are generated in balance. Similarly, for the same reasons, the least efficient light source unit of the three light source units 602, 604 and 606 may be located nearest to the output end 632. In other embodiments, other light sources may be optically coupled to the integrating tunnel 616. For example, additional light sources may be coupled to the far end 634 of the integrating tunnel 610.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the embodiments discussed herein. Therefore, it is manifestly intended that this invention be limited only by the claims and the equivalents thereof.

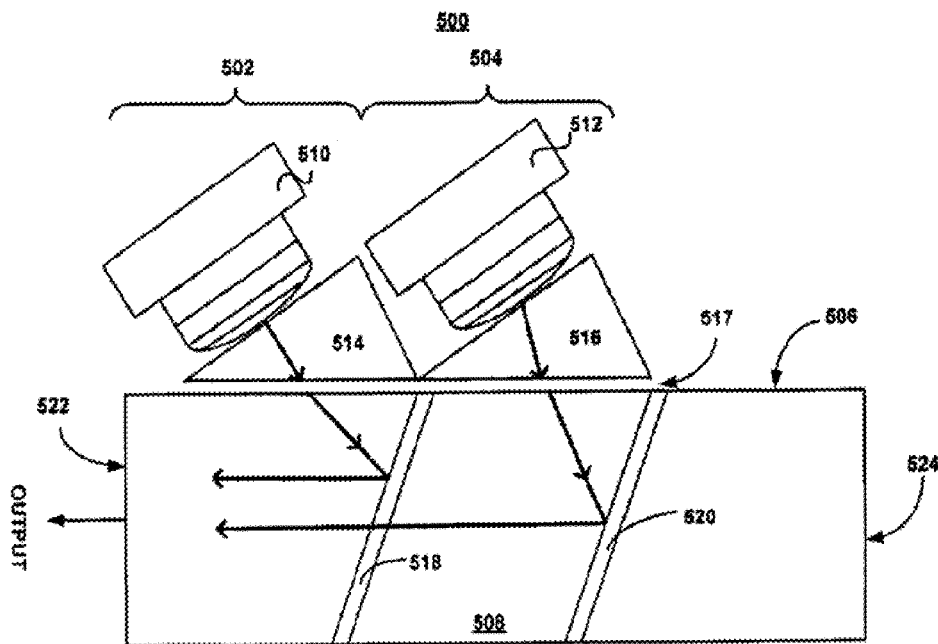

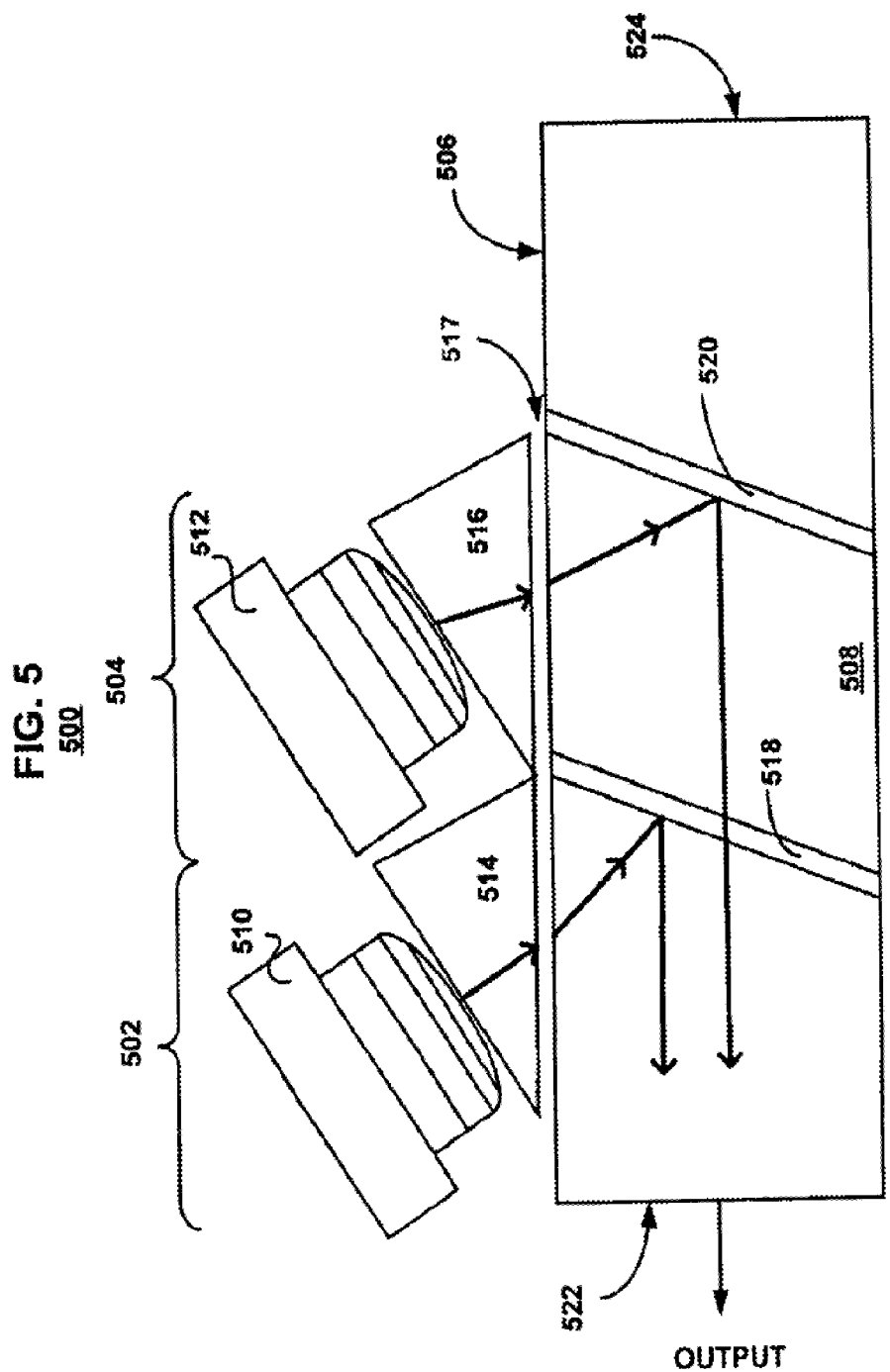

What is claimed is:

1. An illumination module, comprising:
   an integrating tunnel having an output end to output light in an output direction, the integrating tunnel further having a side surface that intersects the output end and a reflective surface, the reflective surface being opposite of the output end; and
   a first light source to output light into the integrating tunnel through a first and a second medium from a direction nonparallel to the direction of the output direction, the first and second medium having different indices of refraction, to facilitate reflecting of the output light from the first light source off the reflective surface, and propagating of the reflected light substantially towards the output end, wherein the first medium is a prism and the second medium is air, the air being adjacent to the side surface.

2. The illumination module of claim 1, wherein the first light source is a selected one of a light emitting diode (LED) and a laser diode.

3. The illumination module of claim 1, further comprises a second light source to output light into the integrating tunnel through a second set of two mediums from a direction nonparallel to the direction of the output direction, the two mediums having different indices of refraction, to facilitate reflecting of the output light from the second light source off a dichroic filter, and propagating the reflected light substantially towards the output end.

4. The illumination module of claim 3, wherein the second set of two mediums comprises a prism and air, the air being adjacent to the side surface.

5. The illumination module of claim 3, wherein the second light source is a selected one of a light emitting diode (LED) and a laser diode.

6. The illumination module of claim 3, further comprises a third light source to output light into the integrating tunnel through a third set of two mediums from a direction nonparallel to the direction of the output direction, the two mediums having different indices of refractions, to facilitate reflecting of the output light from the third light source off a dichroic filter, and propagating the reflected light substantially towards the output end.

7. The illumination module of claim 6, wherein the third set of two mediums comprises a prism and air, the air being adjacent to the side surface.

8. The illumination module of claim 6, wherein the third light source is a selected one of a light emitting diode (LED) and a laser diode.

9. The illumination module of claim 6, wherein the first, second and third light sources are a combination of a red light source, a blue light source and a green light source.

10. The illumination module of claim 1, wherein the reflective surface comprises of one selected from the group consisting of a dichroic filter and a mirror.

11. A projection system, comprising:
    a projection lens;
    an integrating tunnel optically coupled to the projection lens, the integrating tunnel having an output end to output light in an output direction, the integrating tunnel further having a side surface that intersects the output end and a reflective surface, the reflective surface being opposite of the output end; and
    a first light source to output light into the integrating tunnel through a first and a second medium from a direction nonparallel to the direction of the output direction, the first and second medium having different indices of refraction, to facilitate reflecting of the output light from the first light source off the reflective surface, and propagating the reflected light substantially towards the output end, wherein the first medium is a prism and the second medium is air, the air being adjacent to the side surface.

12. The projection system of claim 11, wherein the first light source is a selected one of a light emitting diode (LED) and a laser diode.

13. The projection system of claim 11, further comprises a second light source to output light into the integrating tunnel through a second set of two mediums from a direction nonparallel to the direction of the output direction, the two mediums having different indices of refraction, to facilitate reflecting of the output light from the second light source off a dichroic filter, and propagating the reflected light substantially towards the output end.

14. The projection system of claim 13, wherein the second set of two mediums comprises of a prism and air, the air being adjacent to the side surface.

15. The projection system of claim 13, wherein the second light source is a selected one of a light emitting diode (LED) and a laser diode.

16. The projection system of claim 13, further comprises a third light source to output light into the integrating tunnel through a third set of two mediums from a direction nonparallel to the direction of the output direction, the two mediums having different indices of refractions, to facilitate reflecting of the output light from the third light source off a dichroic filter, and propagating the reflected light substantially towards the output end.

17. The projection system of claim 16, wherein the third set of two mediums comprises of a prism and air, the air being adjacent to the side surface.

18. The projection system of claim 16, wherein the third light source is a selected one of a light emitting diode (LED) and a laser diode.

19. The projection system of claim 16, wherein the first, second and third light sources are a combination of a red light source, a blue light source and a green light source.

20. The projection system of claim 11, wherein the projection system further comprises a light valve device optically coupled to the integrating tunnel to direct light bundles outputted by the integrating tunnel to the projection lens.

21. The projection system of claim 11, wherein the projection system further comprises:

a processor coupled to the first light source; and an input interface coupled to the processor to facilitate input to the processor pixel data of an image.

22. In a projection system, a method of operation, comprising:

receiving pixel data of an image to be projected; and controlling a light source to output light into an integrating tunnel through a first and a second medium from a direction nonparallel to an output direction of the integrating tunnel, the first and second medium having different indices of refraction, to facilitate reflecting of the output light from the light source off a reflective surface of the integrating tunnel and propagating the reflected light substantially towards an output end of the integrating tunnel, wherein the first medium is a prism and the second medium is air, the air being adjacent to the side surface, resulting in the output end outputting light in the output direction, the integrating tunnel having a side surface that intersects with the output end and the reflective surface, the reflective surface being opposite of the output end.

23. The method of claim 22, wherein said controlling of a light source comprises of controlling the light source to output color light bundles selected from the group consisting of blue, green and red light bundles.

24. The method of claim 23, wherein said controlling of a light source comprises controlling the light source to alternate in transmitting the color light bundles at different points in time as needed for the projection of the image.

25. The method of claim 22, further comprises controlling a light valve device in a complementary manner.

* * * * *

UNITED STATES PATENT AND TRADEMARK OFFICE
CERTIFICATE OF CORRECTION

PATENT NO. : 7,059,726 B2  Page 1 of 3
APPLICATION NO. : 10/883905
DATED : January 13, 2006
INVENTOR(S) : T. Scott Engle It is certified that error appears in the above-identified patent and that said Letters Patent is hereby corrected as shown below:

Delete Title page illustrating a figure, and substitute therefor, new Title page illustrating a figure. (attached)

Delete drawing sheet 6, consisting of figure 5, and substitute therefor drawing sheet 6, consisting of Figure 5, as shown on the attached sheet.

In the Detailed Description:
Col. 3, line 36 "...light valve 206"..." should read --...light valve device 206...--;

Col. 6, line 29 "...light bundles enters..." should read --...light bundles enter...--;

Col. 7, line 28 "...light bundles propagates..." should read
--...light bundles propagate...--;

Col. 8, line 21 "...air gap 516..." should read --...air gap 517...--;

Col. 9, line 44, "...integrating tunnel 616..." should read --...integrating tunnel 610...--.

Signed and Sealed this

Seventeenth Day of June, 2008

JON W. DUDAS
*Director of the United States Patent and Trademark Office*

United States Patent
Engle

(12) United States Patent
(10) Patent No.: US 7,059,726 B2
(45) Date of Patent: Jun. 13, 2006

(54) PROJECTION APPARATUS WITH LIGHT SOURCE TO OUTPUT LIGHT INTO AN INTEGRATING TUNNEL THROUGH A FIRST AND A SECOND MEDIUM

(75) Inventor: T. Scott Engle, Tualatin, OR (US)

(73) Assignee: Infocus Corporation, Wilsonville, OR (US)

(*) Notice: Subject to any disclaimer, the term of this patent is extended or adjusted under 35 U.S.C. 154(b) by 0 days.

(21) Appl. No.: 10/883,905

(22) Filed: Jul. 2, 2004

(65) Prior Publication Data
US 2006/0001843 A1 Jan. 5, 2006

(51) Int. Cl.
*G03B 21/28* (2006.01)
*G02F 1/1335* (2006.01)

(52) U.S. Cl. .............. 353/81; 353/28; 353/20; 348/798; 348/801; 349/62

(58) Field of Classification Search .............. 353/28, 353/20, 31, 80–87, 122; 348/798–803; 349/69, 349/61, 62; 362/51, 555, 561, 582, 800
See application file for complete search history.

(56) References Cited

U.S. PATENT DOCUMENTS

| 6,688,747 B1* | 2/2004 | Wichner et al. | 353/29 |
| 2002/0186350 A1* | 12/2002 | Peterson | 353/29 |
| 2003/0090632 A1* | 5/2003 | Kim et al. | 353/31 |
| 2003/0197834 A1* | 10/2003 | Kang | 353/31 |
| 2004/0174501 A1* | 9/2004 | Slobodin et al. | 353/98 |
| 2005/0018149 A1* | 1/2005 | Takeda et al. | 353/99 |
| 2005/0088624 A1* | 4/2005 | Lee et al. | 353/31 |

* cited by examiner

*Primary Examiner*—W. B. Perkey
*Assistant Examiner*—Andrew Sever
(74) *Attorney, Agent, or Firm*—Schwabe Williamson & Wyatt

(57) ABSTRACT

A projection apparatus that includes a light source optically coupled to an integrating tunnel to output light into the integrating tunnel through a first and a second medium from a direction nonparallel to the output direction of the integrating tunnel. The first and second mediums having different indices of refraction to facilitate reflection of the output light from the light source off a reflective surface of the integrating tunnel and propagating the reflected light substantially towards an output end of the integrating tunnel.

25 Claims, 7 Drawing Sheets

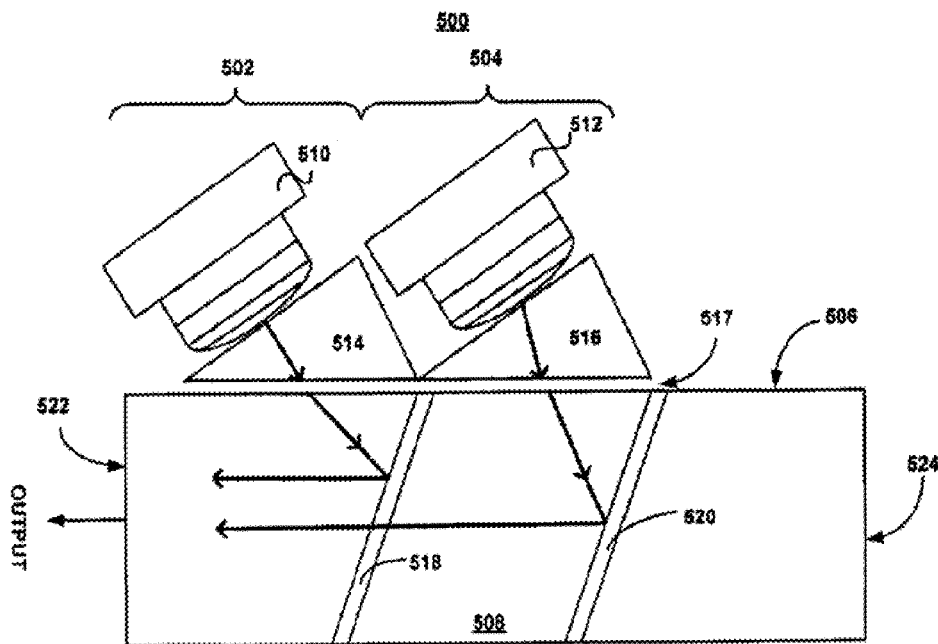

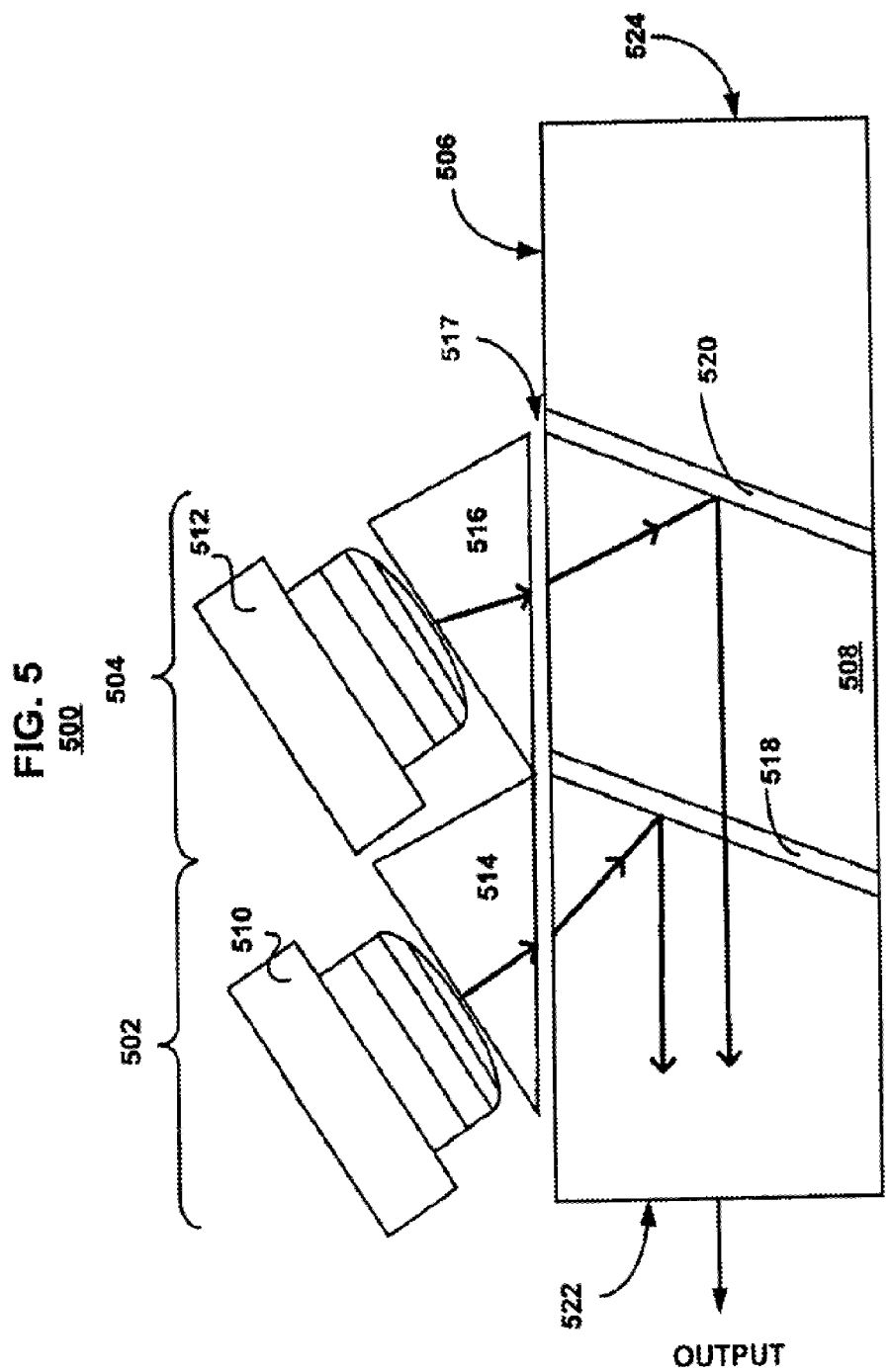

UNITED STATES PATENT AND TRADEMARK OFFICE
CERTIFICATE OF CORRECTION

| | | |
|---|---|---|
| PATENT NO. | : 7,059,726 B2 | Page 1 of 3 |
| APPLICATION NO. | : 10/883905 | |
| DATED | : June 13, 2006 | |
| INVENTOR(S) | : T. Scott Engle | |

It is certified that error appears in the above-identified patent and that said Letters Patent is hereby corrected as shown below:

Delete Title page illustrating a figure, and substitute therefor, new Title page illustrating a figure. (attached)

Delete drawing sheet 6, consisting of figure 5, and substitute therefor drawing sheet 6, consisting of Figure 5, as shown on the attached sheet.

In the Detailed Description:
Col. 3, line 36 "...light valve 206"..." should read --...light valve device 206...--;

Col. 6, line 29 "...light bundles enters..." should read --...light bundles enter...--;

Col. 7, line 28 "...light bundles propagates..." should read
--...light bundles propagate...--;

Col. 8, line 21 "...air gap 516..." should read --...air gap 517...--;

Col. 9, line 44, "...integrating tunnel 616..." should read --...integrating tunnel 610...--.

This certificate supersedes the Certificate of Correction issued June 17, 2008.

Signed and Sealed this

Fifteenth Day of July, 2008

JON W. DUDAS
*Director of the United States Patent and Trademark Office*

(12) United States Patent
Engle

(10) Patent No.: US 7,059,726 B2
(45) Date of Patent: Jun. 13, 2006

(54) PROJECTION APPARATUS WITH LIGHT SOURCE TO OUTPUT LIGHT INTO AN INTEGRATING TUNNEL THROUGH A FIRST AND A SECOND MEDIUM

(75) Inventor: T. Scott Engle, Tualatin, OR (US)

(73) Assignee: Infocus Corporation, Wilsonville, OR (US)

(*) Notice: Subject to any disclaimer, the term of this patent is extended or adjusted under 35 U.S.C. 154(b) by 0 days.

(21) Appl. No.: 10/883,905

(22) Filed: Jul. 2, 2004

(65) Prior Publication Data
US 2006/0001843 A1    Jan. 5, 2006

(51) Int. Cl.
*G03B 21/28* (2006.01)
*G02F 1/1335* (2006.01)

(52) U.S. Cl. .............. 353/81; 353/28; 353/20; 348/798; 348/801; 349/62

(58) Field of Classification Search ........ 353/28, 353/20, 31, 80–87, 122; 348/798–803; 349/69, 349/61, 62; 362/51, 555, 561, 582, 800
See application file for complete search history

(56) References Cited

U.S. PATENT DOCUMENTS

| 6,688,747 B1* | 2/2004 | Wichner et al. ......... 353/29 |
| 2002/0186350 A1* | 12/2002 | Peterson ............... 353/29 |
| 2003/0090632 A1* | 5/2003 | Kim et al. .............. 353/31 |
| 2003/0197834 A1* | 10/2003 | Kang .................... 353/31 |
| 2004/0174501 A1* | 9/2004 | Slobodin et al. ....... 353/98 |
| 2005/0018149 A1* | 1/2005 | Takeda et al. ......... 353/99 |
| 2005/0088624 A1* | 4/2005 | Lee et al. ............... 353/31 |

* cited by examiner

*Primary Examiner*—W. B. Perkey
*Assistant Examiner*—Andrew Sever
(74) *Attorney, Agent, or Firm*—Schwabe Williamson & Wyatt

(57) ABSTRACT

A projection apparatus that includes a light source optically coupled to an integrating tunnel to output light into the integrating tunnel through a first and a second medium from a direction nonparallel to the output direction of the integrating tunnel. The first and second mediums having different indices of refraction to facilitate reflection of the output light from the light source off a reflective surface of the integrating tunnel and propagating the reflected light substantially towards an output end of the integrating tunnel.

25 Claims, 7 Drawing Sheets